United States Patent
Zhong

(10) Patent No.: US 12,497,998 B2
(45) Date of Patent: Dec. 16, 2025

(54) MULTIPLE GUIDANCE CAGE FOR A BEARING

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 18/408,575

(22) Filed: Jan. 10, 2024

(65) Prior Publication Data

US 2025/0224001 A1   Jul. 10, 2025

(51) Int. Cl.
 *F16C 19/16* (2006.01)
 *F16C 33/38* (2006.01)
 *F16C 33/41* (2006.01)

(52) U.S. Cl.
 CPC ........ *F16C 33/3806* (2013.01); *F16C 19/163* (2013.01); *F16C 33/41* (2013.01); *F16C 2361/61* (2013.01)

(58) Field of Classification Search
 CPC .... F16C 19/16; F16C 19/163; F16C 19/3806; F16C 19/3887; F16C 19/41; F16C 19/412; F16C 19/414; F16C 19/416; F16C 19/418; F16C 2361/61
 See application file for complete search history.

(56) References Cited

U.S. PATENT DOCUMENTS

| | | | |
|---|---|---|---|
| 6,533,462 B2 * | 3/2003 | Kawakami | F16C 33/414 384/531 |
| 11,555,519 B1 | 1/2023 | Natusch | |
| 2017/0023062 A1 * | 1/2017 | Kamamoto | F16C 33/416 |
| 2017/0268570 A1 * | 9/2017 | Kamamoto | F16C 33/416 |
| 2021/0140476 A1 * | 5/2021 | Yamamoto | F16C 33/3806 |
| 2021/0140477 A1 * | 5/2021 | Akimoto | F16C 19/16 |

FOREIGN PATENT DOCUMENTS

| | | | | |
|---|---|---|---|---|
| JP | H0949525 A | * | 2/1997 | |
| JP | 2000291662 A | * | 10/2000 | F16C 33/41 |

OTHER PUBLICATIONS

JP2000291662A_Description.*
JPH0949525A_Description.*

* cited by examiner

*Primary Examiner* — Phillip A Johnson

(57) ABSTRACT

A multiple guidance cage for a bearing includes an axis, and a cylindrical ring extending around the axis. The cylindrical ring includes a plurality of partial spherical cutouts distributed circumferentially about the cylindrical ring, and a plurality of segments. Each one of the plurality of segments is disposed between a pair of the plurality of partial spherical cutouts. Each of the plurality of partial spherical cutouts is arranged for receiving a rolling element, and each one of the plurality of segments includes a distal end with a radial bump. In an example embodiment, each one of the plurality of segments is axially recessed between the pair of the plurality of partial spherical cutouts.

17 Claims, 4 Drawing Sheets

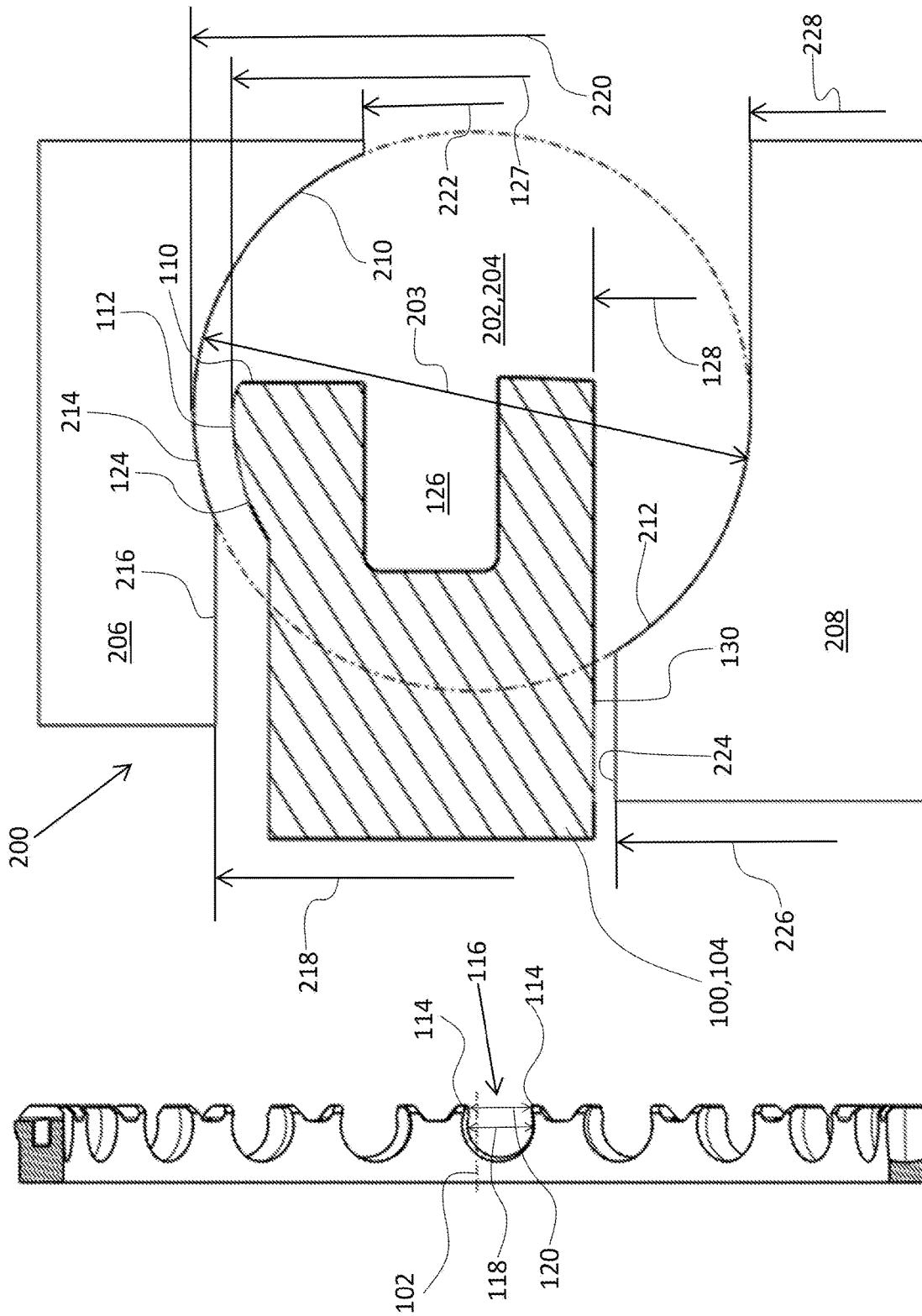

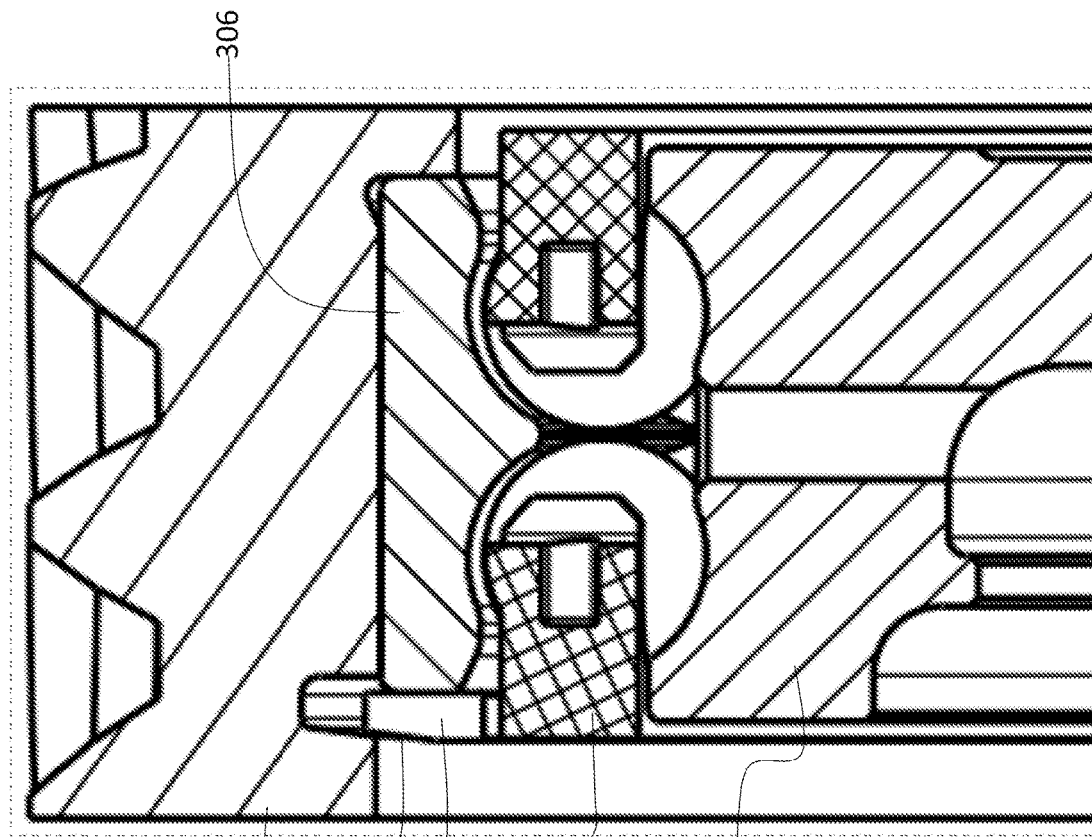
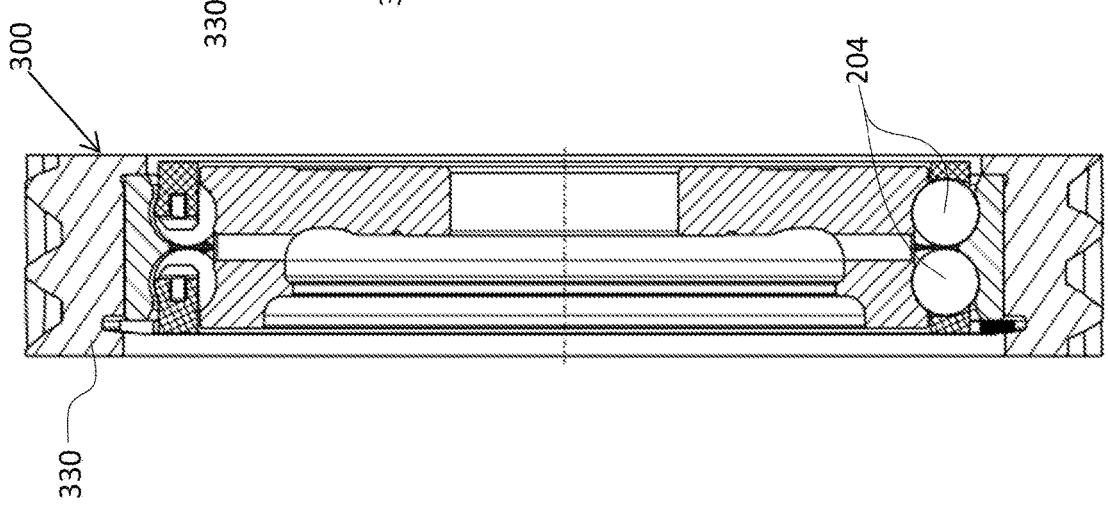

MULTIPLE GUIDANCE CAGE FOR A BEARING

TECHNICAL FIELD

The present disclosure relates generally to a cage for a bearing, and more specifically to a multiple guidance cage for a bearing.

BACKGROUND

Bearing cages are known. One example is shown and described in commonly-assigned U.S. Pat. No. 11,555,519 titled CAGE WITH PUMPING VANE AND BEARING INCLUDING CAGE WITH PUMPING VANE to Natusch et al., hereby incorporated by reference as if set forth fully herein.

SUMMARY

Example embodiments broadly comprise a multiple guidance cage for a bearing including an axis, and a cylindrical ring extending around the axis. The cylindrical ring includes a plurality of partial spherical cutouts distributed circumferentially about the cylindrical ring, and a plurality of segments. Each one of the plurality of segments is disposed between a pair of the plurality of partial spherical cutouts. Each of the plurality of partial spherical cutouts is arranged for receiving a rolling element, and each one of the plurality of segments includes a distal end with a radial bump. In an example embodiment, each one of the plurality of segments is axially recessed between the pair of the plurality of partial spherical cutouts.

In some example embodiments, each one of the plurality of partial spherical cutouts comprises an axial opening. In an example embodiment, each one of the plurality of partial spherical cutouts includes a same spherical cutout diameter and an axial opening with a width that is less than the spherical cutout diameter. In some example embodiments, each one of the plurality of segments comprises an outer cylindrical surface, and the radial bump extends circumferentially along the outer cylindrical surface. In an example embodiment, the radial bump extends radially outwards from the outer cylindrical surface. In an example embodiment, the radial bump includes a rounded profile in a section view formed by a radial plane extending parallel to the axis. In some example embodiments, each one of the plurality of segments includes an axially extending cutout. In an example embodiment, the axially extending cutout has a rectangular end face when viewed in an axial direction.

Other example embodiments broadly comprise a bearing including the multiple guidance cage and a plurality of balls operating as rolling elements. Each one of the plurality of balls is disposed in a one of the plurality of partial spherical cutouts. In some example embodiments, the bearing also includes an outer ring disposed radially outside of the multiple guidance cage and an inner ring disposed radially inside of the multiple guidance cage. The outer ring includes an outer ball race and the inner ring includes an inner ball race. In an example embodiment. In an example embodiment, a profile of the radial bump matches a profile of the outer ball race when viewed in a section view formed by a radial plane extending parallel to the axis.

In some example embodiments, the outer ring includes an inner cylindrical surface with an inner diameter, and the multiple guidance cage includes an outer diameter measured at the radial bump that is less than the inner diameter. In an example embodiment, an inner diameter of the outer ball race is greater than the inner diameter of the inner cylindrical surface. In an example embodiment, an outer diameter of the outer ring is less than the inner diameter of the inner cylindrical surface. In some example embodiments, the inner ring includes an outer cylindrical surface with an outer diameter, and the multiple guidance cage includes an inner diameter that is greater than the outer diameter. In an example embodiment, an inner diameter of the inner ball race is less than the outer diameter of the outer cylindrical surface.

BRIEF DESCRIPTION OF THE DRAWINGS

FIG. 3 illustrates a cross-sectional view of the multiple guidance cage of FIG. 1.

FIG. 4 illustrates a detail view of the multiple guidance cage of FIG. 3 shown schematically in a bearing.

FIG. 6 illustrates a cross-sectional view of the bearing of FIG. 5.

FIG. 7 illustrates a detail view of the bearing of FIG. 6.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
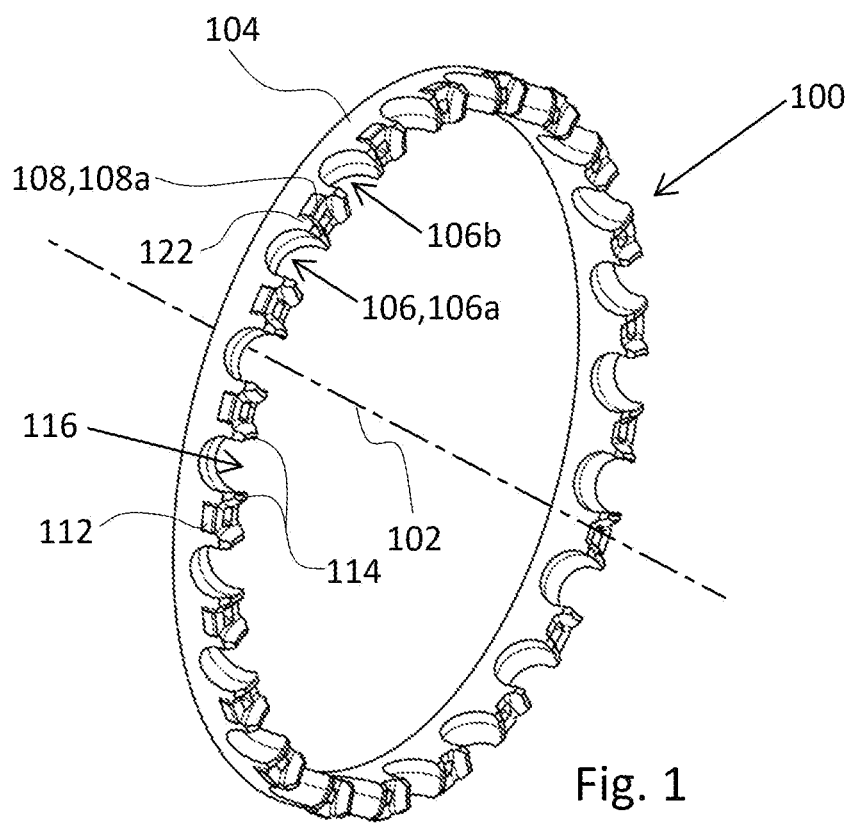
FIG. 1 illustrates a perspective view of an example embodiment of a multiple guidance cage for a bearing.
Figure 2:
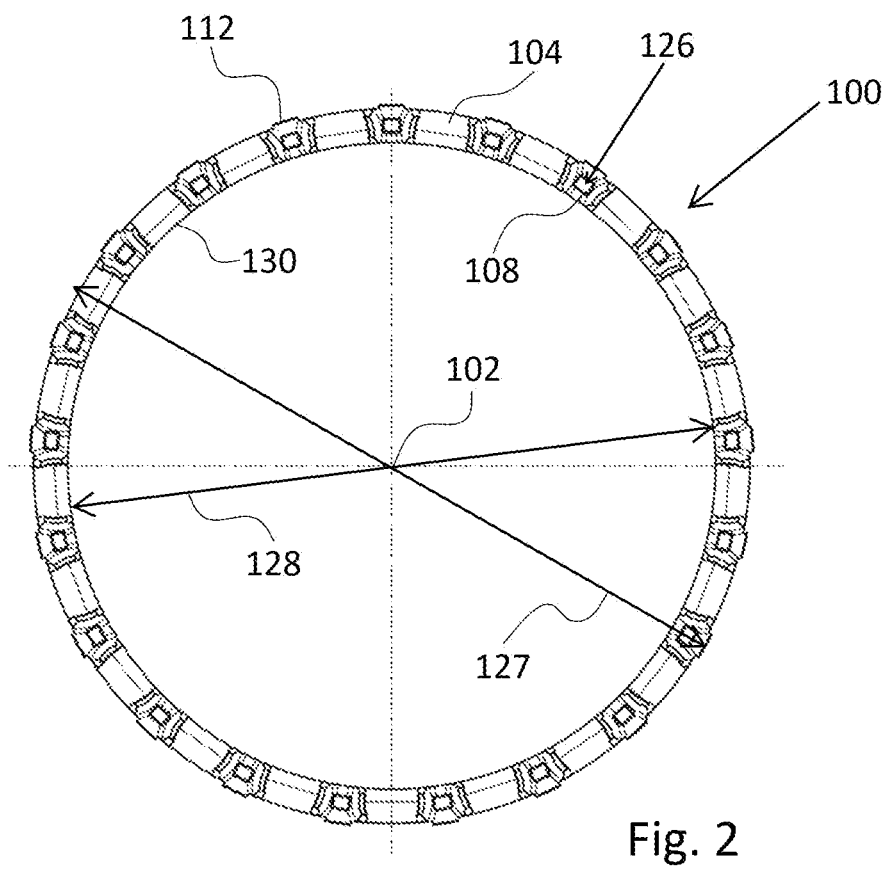
FIG. 2 illustrates a top view of the multiple guidance cage of FIG. 1.

The following description is made with reference to FIGS. 1-4. FIG. 1 illustrates a perspective view of multiple guidance cage 100 for a bearing. FIG. 2 illustrates a top view of the multiple guidance cage of FIG. 1. FIG. 3 illustrates a cross-sectional view of the multiple guidance cage of FIG.

1. FIG. 4 illustrates a detail view of the multiple guidance cage of FIG. 3 shown schematically in bearing 200.

Multiple guidance cage 100 includes axis 102 and cylindrical ring 104 extending around the axis. Cage 100 may be formed from a commercially available known plastic material such as PA46-GF30, PA66_GF30 or PEEK, for example. The cylindrical ring includes partial spherical cutouts 106 distributed circumferentially about the cylindrical ring, and segments 108. Segments 108 may be known as cage bars, for example. Each of the partial spherical cutouts is arranged for receiving a rolling element (e.g., rolling elements 202 in FIG. 4). The partial spherical cutouts are formed by cutting a spherical shape out of the cylindrical ring, for example. Because the spherical shape is larger than the cylindrical ring, only a portion of the sphere is shown. Each of segments 108 is disposed between a pair of partial spherical cutouts 106 (e.g., segment 108a is disposed circumferentially between cutouts 106a and 106b in FIG. 1). Segments 108 each include distal end 110 with radial bump 112. Each of segments 108 is axially recessed between the pair of partial spherical cutouts. That is, the cutout portion of the cylindrical ring includes axially distant edges 114 and the segments are axially recessed from edges 114. Otherwise, stated, the partial spherical cutout portion of the cylindrical ring extends axially beyond the segment portion of the cylindrical ring.

Each of partial spherical cutouts 106 includes axial opening 116. That is, the cutouts are not fully axially enclosed by the circumferential ring. Each of partial spherical cutouts 106 includes a same spherical cutout diameter 118, and axial opening 116 with width 120 that is less than the spherical cutout diameter. As such, width 120 is also less than rolling element diameter 203 (ref. FIG. 4) so that, once installed, the rolling element is retained in the spherical cutout. As best viewed in FIG. 2, for example, segments 108 include outer cylindrical surfaces 122 and the radial bump extends circumferentially along the outer cylindrical surface. As best viewed in FIG. 4, for example, the radial bump extends radially outwards from the outer cylindrical surface. Radial bump 112 includes rounded profile 124 in a section view formed by a radial plane extending parallel to the axis. Segments 108 includes axially extending cutout 126, and the axially extending cutout has a rectangular end face when viewed in an axial direction (e.g., FIG. 2). Cutout 126 may be added to multiple guidance cage 100 to reduce mass for less deflection at high rotational speeds, for example.

As viewed best in FIG. 4, for example, bearing 200 includes multiple guidance cage 100 and balls 204 (shown as a dashed line) operating as rolling elements 202. Each of balls 204 is disposed in a partial spherical cutouts 106. Bearing 200 also includes outer ring 206 disposed radially outside of multiple guidance cage 100 and inner ring 208 disposed radially inside of the multiple guidance cage. Outer ring 206 includes outer ball race 210 and inner ring 208 includes inner ball race 212. Races 210 and 212 provide a formed surface for low friction rolling of balls 204 during operation of bearing 200. Profile 124 of radial bump 112 matches profile 214 of outer ball race 210 when viewed in a section view formed by a radial plane extending parallel to the axis (e.g., as shown in FIG. 4). For example, the outer ball race has a toroidal inner surface and the radial bump has a similar toroidal outer surface, offset from the outer ball race toroidal inner surface. Since the contours are similar, the radial bumps may contact the outer ball race under excessive ball excursion, limiting cage radial and axial movement and preventing cage ejections.

Outer ring 206 includes inner cylindrical surface 216 with inner diameter 218, and multiple guidance cage 100 includes outer diameter 127 measured at the radial bump that is less than the inner diameter. Outer diameter 220 of outer ball race 210 is greater than inner diameter 218 of inner cylindrical surface 216. Inner diameter 222 of outer ring 206 is less than inner diameter 218 of the inner cylindrical surface. Inner ring 208 includes outer cylindrical surface 224 with outer diameter 226, and multiple guidance cage 100 includes inner diameter 128 that is greater than the outer diameter. Inner diameter 228 of inner ball race 212 is less than outer diameter 226 of outer cylindrical surface 224.

Figure 5:
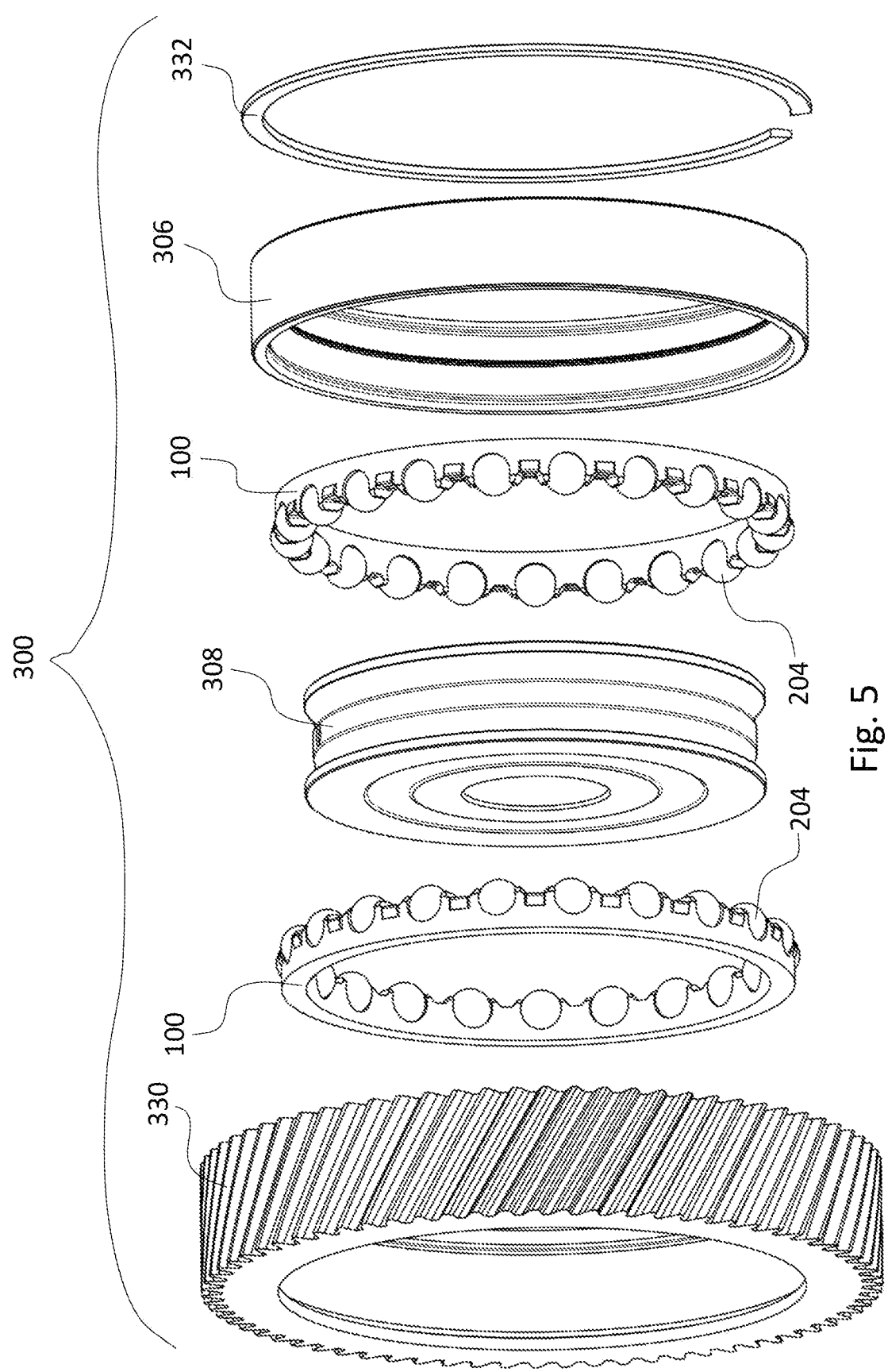
FIG. 5 illustrates an exploded view of a bearing including the multiple guidance cage of FIG. 1.

The following description is made with reference to FIGS. 1-7. FIG. 5 illustrates an exploded view of bearing 300 including multiple guidance cage 100 of FIG. 1. FIG. 6 illustrates a cross-sectional view of the bearing of FIG. 5. FIG. 7 illustrates a detail view of the bearing of FIG. 6. As shown in the figures, bearing 300 has multiple rows of rolling elements, each positioned within a multiple guidance cage 100. Cages 100 are inserted from opposite axial sides of bearing 300. That is, once the balls are installed between outer ring 306 and inner ring 308 in a known manner, the cages may be "snapped" onto the balls to provide circumferential positioning. Radial bumps 112 and inner surface 130 of cylindrical ring 104 restrict axial ejection of the cages from the rings. This may be desirable in applications where the inner ring and outer ring rotate in different directions, leading to a near zero cage speed situation where rolling elements are operating in a mixed friction or dry friction range. In the embodiment shown in FIGS. 5-7, bearing 300 is disposed within gear 330 and axially retained by snap ring 332. Snap ring 332 may included tapered surface 334, for example, for tightly retaining outer race 306 in gear 330 in an axial direction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Multiple guidance cage
102 Axis
104 Cylindrical ring
106 Partial spherical cutouts
106a Partial spherical cutout 106b Partial spherical cutout
108 Segments
108a Segment
110 Distal end (segments 108)
112 Radial bump (segments 108)
114 Axially distant edges (partial spherical cutouts 106)
116 Axial opening (partial spherical cutouts 106)
118 Spherical cutout diameter (partial spherical cutouts 106)
120 Width (axial opening 116)
122 Outer cylindrical surface (segments 108)
124 Profile (radial bump 112)
126 Axially extending cutout (segment 108)
127 Outer diameter (cage 100 at radial bump 112)
128 Inner diameter (cage 100)
130 Inner surface (cylindrical ring 104)
200 Bearing
202 Rolling elements
203 Rolling element diameter
204 Balls
206 Outer ring (bearing 200)
208 Inner ring (bearing 200)
210 Outer ball race (outer ring 206)
212 Inner ball race (inner ring 208)
214 Profile (outer ball race 210)
216 Inner cylindrical surface (outer ring 206)
218 Inner diameter (inner cylindrical surface 216)
220 Outer diameter (outer ball race 210)
222 Inner diameter (outer ring 206)
224 Outer cylindrical surface (inner ring 208)
226 Outer diameter (outer cylindrical surface 224)
228 Inner diameter (inner ball race 212)
300 Bearing
306 Outer ring (bearing 300)
308 Inner ring (bearing 300)
330 Gear
332 Snap ring
334 Tapered surface (snap ring 332)

What is claimed is:

1. A bearing comprising:
a multiple guidance cage comprising an axis and a cylindrical ring extending around the axis, wherein the cylindrical ring comprises
    a plurality of partial spherical cutouts distributed circumferentially about the cylindrical ring, each of the plurality of partial spherical cutouts arranged for receiving a rolling element; and
    a plurality of segments, each one of the plurality of segments disposed between a pair of the plurality of partial spherical cutouts and comprising a distal end with a radial bump;
a plurality of balls operating as rolling elements, each one of the plurality of balls disposed in a one of the plurality of partial spherical cutouts;
    an outer ring disposed radially outside of the multiple guidance cage, the outer ring comprising an outer ball race; and
    an inner ring disposed radially inside of the multiple guidance cage, the inner ring comprising an inner ball race;
wherein the outer ring comprises an inner cylindrical surface with an inner diameter, and
wherein the multiple guidance cage comprises an outer diameter measured at the radial bump that is less than the inner diameter.

2. The bearing of claim 1 wherein a profile of the radial bump matches a profile of the outer ball race when viewed in a section view formed by a radial plane extending parallel to the axis.

3. The bearing of claim 2 wherein:
the inner ring comprises an outer cylindrical surface with an outer diameter; and
the multiple guidance cage comprises an inner diameter that is greater than the outer diameter.

4. The bearing of claim 3 wherein an inner diameter of the inner ball race is less than the outer diameter of the outer cylindrical surface.

5. The bearing of claim 1 wherein an outer diameter of the outer ball race is greater than the inner diameter of the inner cylindrical surface.

6. The bearing of claim 1 wherein an inner diameter of the outer ring is less than the inner diameter of the inner cylindrical surface.

7. The bearing of claim 1 wherein each one of the plurality of segments is axially recessed between the pair of the plurality of partial spherical cutouts.

8. The bearing of claim 1 wherein each one of the plurality of partial spherical cutouts comprises an axial opening.

9. The bearing of claim 8 wherein each one of the plurality of partial spherical cutouts comprises:
a same spherical cutout diameter; and
an axial opening with a width that is less than the spherical cutout diameter.

10. The bearing of claim 1 wherein:
each one of the plurality of segments comprises an outer cylindrical surface; and
the radial bump extends circumferentially along the outer cylindrical surface.

11. The bearing of claim 10 wherein the radial bump extends radially outwards from the outer cylindrical surface.

12. The bearing of claim 10 wherein the radial bump comprises a rounded profile in a section view formed by a radial plane extending parallel to the axis.

13. The bearing of claim 1 wherein each one of the plurality of segments comprises an axially extending cutout.

14. The bearing of claim 13 wherein the axially extending cutout has a rectangular end face when viewed in an axial direction.

15. A bearing comprising:
a multiple guidance cage comprising a cylindrical ring extending around an axis, wherein the cylindrical ring comprises
    a plurality of partial spherical cutouts distributed circumferentially about the cylindrical ring, each of the plurality of partial spherical cutouts arranged for receiving a ball; and
    a plurality of segments, each one of the plurality of segments disposed between a pair of the plurality of partial spherical cutouts and comprising a distal end with a radial extending bump;
a plurality of balls, each one of the plurality of balls disposed in a one of the plurality of partial spherical cutouts;
an outer ring disposed radially outside of the multiple guidance cage, the outer ring comprising an outer ball race; and
an inner ring disposed radially inside of the multiple guidance cage,
wherein the outer ring comprises an inner cylindrical surface with an inner diameter, and wherein the multiple guidance cage comprises an outer diameter measured at the radial bump that is less than the inner diameter.

16. The bearing of claim 15 wherein an outer diameter of the outer ball race is greater than the inner diameter of the inner cylindrical surface.

17. The bearing of claim 15 wherein an inner diameter of the outer ring is less than the inner diameter of the inner cylindrical surface.

\* \* \* \* \*